(12) United States Patent
Kishi et al.

(10) Patent No.: US 10,899,225 B2
(45) Date of Patent: Jan. 26, 2021

(54) VEHICLE CONTROL DEVICE, VEHICLE CONTROL METHOD, AND STORAGE MEDIUM

(71) Applicant: HONDA MOTOR CO., LTD., Tokyo (JP)

(72) Inventors: Takayuki Kishi, Wako (JP); Satoshi Hanyu, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/680,543

(22) Filed: Nov. 12, 2019

(65) Prior Publication Data

US 2020/0164744 A1 May 28, 2020

(30) Foreign Application Priority Data

Nov. 26, 2018 (JP) ................... 2018-220697

(51) Int. Cl.
*B60K 23/08* (2006.01)
(52) U.S. Cl.
CPC ............... *B60K 23/0808* (2013.01)
(58) Field of Classification Search
CPC ....... B60K 23/0808; B60K 2023/0816; B60W 10/119; B60W 10/14; B60W 30/02; B60W 2520/403; B60W 2720/403
See application file for complete search history.

(56) References Cited

U.S. PATENT DOCUMENTS

| | | | |
|---|---|---|---|
| 2008/0004780 A1* | 1/2008 | Watanabe | B60K 6/40 701/54 |
| 2008/0289894 A1* | 11/2008 | Muta | B60W 10/24 180/248 |
| 2009/0088919 A1* | 4/2009 | Muta | B60L 50/16 701/69 |
| 2012/0253614 A1* | 10/2012 | Hiroya | B60K 17/344 701/51 |
| 2016/0368503 A1* | 12/2016 | Jonasson | B60W 40/064 |

FOREIGN PATENT DOCUMENTS

| | | |
|---|---|---|
| JP | 05-180030 | 7/1993 |
| JP | 05-338457 | 12/1993 |
| JP | 3169683 | 5/2001 |
| JP | 2002-127772 | 5/2002 |
| JP | 2005-162097 | 6/2005 |
| JP | 2008-155815 | 7/2008 |
| JP | 2013-192446 | 9/2013 |

OTHER PUBLICATIONS

Japanese Office Action for Japanese Patent Application No. 2018-220697 dated Aug. 25, 2020.

* cited by examiner

*Primary Examiner* — Edwin A Young

(74) *Attorney, Agent, or Firm* — Amin, Turocy & Watson, LLP

(57) ABSTRACT

A vehicle control device includes a first calculator configured to calculate a first operation amount, a second calculator configured to calculate a second operation amount, and a controller configured to cause the operation amount of one driving force control to be changed to zero in a predetermined time, causes the operation amount of the other driving force control to be increased to a target operation amount in the predetermined time, and controls a driving force of the vehicle on the basis of the operation amount of one driving force control and the operation amount of the other driving force control during the predetermined time.

10 Claims, 11 Drawing Sheets

VEHICLE CONTROL DEVICE, VEHICLE CONTROL METHOD, AND STORAGE MEDIUM

CROSS-REFERENCE TO RELATED APPLICATION

Priority is claimed on Japanese Patent Application No. 2018-220697, filed Nov. 26, 2018, the content of which is incorporated herein by reference.

BACKGROUND

Field of the Invention

The present invention relates to a vehicle control device, a vehicle control method, and a storage medium.

Description of Related Art

Conventionally, a four-wheel drive device having a mechanism capable of changing a driving force distribution of front and rear wheels includes a unit that estimates a road surface friction coefficient using information on a steering angle, a steering torque, and a wheel speed, a unit that calculates a slip amount of the front and rear wheel speeds, a unit that calculates a control amount for determining a driving force distribution using a vehicle wheel speed and the slip amount, and a unit that corrects a control amount using the road surface friction coefficient, and a device that changes a driving force distribution depending on a road surface friction coefficient and the speed slip amount of front and rear wheel speeds and suppresses the slip amount in accordance with a traveling situation of a vehicle, and a device that sets a torque distribution ratio of front wheels and rear wheels in accordance with a size of a difference in sideslip angle such that the torque distribution to the rear wheels decreases as the difference in sideslip angle of the rear wheels from a sideslip angle of the front wheels increases, and the torque distribution is performed on the basis of this torque distribution ratio, thereby effectively suppresses a sideslip of vehicle wheels on a side on which a larger sideslip occurs are disclosed (Japanese Unexamined Patent Application, First Publication No. H5-338457, Japanese Patent No. 3169683).

SUMMARY

However, in the above technology, a case of interference from different controls or switching of control is not considered.

The present invention has been made in consideration of such circumstances, and one object thereof is to provide a vehicle control device, a vehicle control method, and a storage medium that can control a vehicle with higher accuracy in various cases.

The vehicle control device, the vehicle control method, and the storage medium according to the present invention adopt the following configurations.

(1) A vehicle control device according to one aspect of the present invention includes a first calculator configured to calculate a first operation amount that is a command value of a distribution ratio of a front and rear driving force of first driving force control (for example, "front and rear LSD control" or "yaw rate FB control" in an embodiment) for controlling a driving force of front and rear driving wheels of a vehicle, a second calculator configured to calculate a second operation amount that is a command value of a distribution ratio of a front and rear driving force of second driving force control (control different from the first driving force control between the "front and rear LSD control" and the "yaw rate FB control" in the embodiment) for controlling the driving force of the front and rear driving wheels of the vehicle, and a controller configured to control the vehicle by switching between the first operation amount and the second operation amount on the basis of a sign indicating a bias of the distribution ratio of the first operation amount calculated by the first calculator and a sign indicating a bias of the distribution ratio of the second operation amount calculated by the second calculator, in which, when one of the first driving force control and the second driving force control is switched to the other driving force control and when the sign of the operation amount of the one driving force control is different from the sign of the operation amount of the other driving force control, the controller causes the operation amount of the one driving force control to be changed to zero in a predetermined time, causes the operation amount of the other driving force control to be increased to a target operation amount in the predetermined time, and controls a driving force of the vehicle on the basis of the operation amount of the one driving force control and the operation amount of the other driving force control during the predetermined time.

(2): In the aspect of (1) described above, the controller may cause the first operation amount to be changed to zero over the predetermined time, and cause the second operation amount to be changed to the target operation amount over the predetermined time such that a sum of the operation amount of the one driving control and the operation amount of the other driving control is the target operation amount of the other driving force control during the predetermined time, and stop calculation of the first operation amount after the predetermined time elapses.

(3): In the aspect of (1) described above, the controller may set the operation amount of the one driving force control to be an initial value of the operation amount of the other driving force control when the one driving force control is switched to the other driving force control and when the sign of the operation amount of the one driving force control is the same as the sign of the operation amount of the other driving force control.

(4): In the aspect of any one of (1) to (3) described above, one of the first driving force control and the second driving force control may be slip suppression control for controlling the driving force when a vehicle speed is equal to or lower than a first vehicle speed or exceeds the first vehicle speed, and a turning amount is equal to or less than a first turning amount, and the other control different from the one control may be posture stabilization control for controlling the driving force when the vehicle speed is equal to or higher than a second vehicle speed or the turning amount is equal to or greater than a second turning amount.

(5): In the aspect of (4) described above, the slip suppression control may be executed when a degree of acceleration increase is equal to or greater than a threshold value, when the vehicle speed is equal to or lower than a third vehicle speed higher than the first vehicle speed, or exceeds the third vehicle speed, and when the turning amount is equal to or less than a third turning amount greater than the first turning amount.

(6): In the aspect of any one of (1) to (5) described above, the first driving force control may be slip suppression control for controlling the driving force when a vehicle speed is equal to or lower than a first vehicle speed, or exceeds the first vehicle speed, and a turning amount is equal to or less than the first turning amount, the second driving force control may be posture stabilization control for controlling the driving force when the vehicle speed is equal to or higher than a second vehicle speed or the turning amount is equal to or greater than a second tuning amount, and when the first driving force control is switched to the second driving force control, the predetermined time may be set to be shorter when the vehicle speed is high than when the vehicle speed is low.

(7): In the aspect of any one of (1) to (5) described above, when the second driving force control is switched to the first driving force control, the predetermined time may be set to be longer when the vehicle speed is high than when the vehicle speed is low.

(8): In the aspect of any one of (1) to (3) described above, the vehicle control device further includes a first detector configured to detect information for acquiring a difference between a wheel speed of front wheels and a wheel speed of rear wheels of a vehicle, a second detector configured to detect a steering angle of the vehicle, and a third detector configured to detect a yaw rate of the vehicle, and the first calculator may calculate a first operation amount for suppressing the difference between the wheel speed of the front wheels and the wheel speed of the rear wheels on the basis of a result of detection of the first detector, and the second calculator may calculate a second operation amount for controlling a state of the vehicle such that the vehicle does not have an oversteer tendency or understeer tendency, on the basis of a result of detection of the second detector and a result of detection of the third detector.

(9): A vehicle control method according to another aspect of the present invention includes, by a control device, calculating a first operation amount that is a command value of a distribution ratio of a front and rear driving force of first driving force control for controlling a driving force of front and rear driving wheels of a vehicle, calculating a second operation amount that is a command value of a distribution ratio of a front and rear driving force of a second driving force control for controlling the driving force of the front and rear driving wheels of the vehicle, and controlling the vehicle by switching between the first operation amount and the second operation amount on the basis of a sign indicating a bias of the distribution ratio of the first operation amount calculated and a sign indicating a bias of the distribution ratio of the second operation amount calculated, in which, when one of the first driving force control and the second driving force control is switched to the other driving force control and when the sign of the operation amount of the one driving force control is different from the sign of the operation amount of the other driving force control, the operation amount of the one driving force control is caused to be changed to zero in a predetermined time, the operation amount of the other driving force control is caused to be increased to a target operation amount in the predetermined time, and a driving force of the vehicle is controlled on the basis of the operation amount of the one driving force control and the operation amount of the other driving force control during the predetermined time.

(10): A non-transitory computer-readable storage medium that stores a computer program to be executed by a control device to perform at least: calculate a first operation amount that is a command value of a distribution ratio of a front and rear driving force of first driving force control for controlling a driving force of front and rear driving wheels of a vehicle, to calculate a second operation amount that is a command value of a distribution ratio of a front and rear driving force of a second driving force control for controlling the driving force of the front and rear driving wheels of the vehicle, and to control the vehicle by switching between the first operation amount and the second operation amount on the basis of a sign indicating a bias of the distribution ratio of the first calculated operation amount and a sign indicating a bias of the distribution ratio of the second calculated operation amount, in which, when one of the first driving force control and the second driving force control is switched to the other driving force control and when the sign of the operation amount of the one driving force control is different from the sign of the operation amount of the other driving force control, the operation amount of the one driving force control is caused to be changed to zero in a predetermined time, the operation amount of the other driving force control is caused to be increased to a target operation amount in the predetermined time, and a driving force of the vehicle is controlled on the basis of the operation amount of the one driving force control and the operation amount of the other driving force control during the predetermined time.

According to (1) to (10), when one driving force control is switched to the other driving force control and when the sign indicating the bias of the distribution ratio of the operation amount of the one driving force control is different from the sign indicating the bias of the distribution ratio of the operation amount of the other driving force control, the vehicle control device can cause the operation amount of the one driving force control to be changed to zero in a predetermined time, cause the operation amount of the other driving force control to be increased to a target operation amount in the predetermined time, control a driving force of the vehicle on the basis of the operation amount of the one driving force control and the operation amount of the other driving force control during the predetermined time, and thereby it is possible to control the vehicle with higher accuracy.

According to (3), it is possible to control the vehicle with higher accuracy by controlling the vehicle on the basis of the first operation amount and the second operation amount during the predetermined time when the signs indicating the bias of the distribution ratio of the operation amounts of the first operation amount and the second operation amount are different from each other, and setting the operation amount of driving force control before execution to an initial value of the operation amount to be executed when signs of the first operation amount and the second operation amount are the same.

DETAILED DESCRIPTION

Hereinafter, embodiments of a vehicle control device, a vehicle control method, and a storage medium of the present invention will be described with reference to the drawings.

First Embodiment

Figure 1:
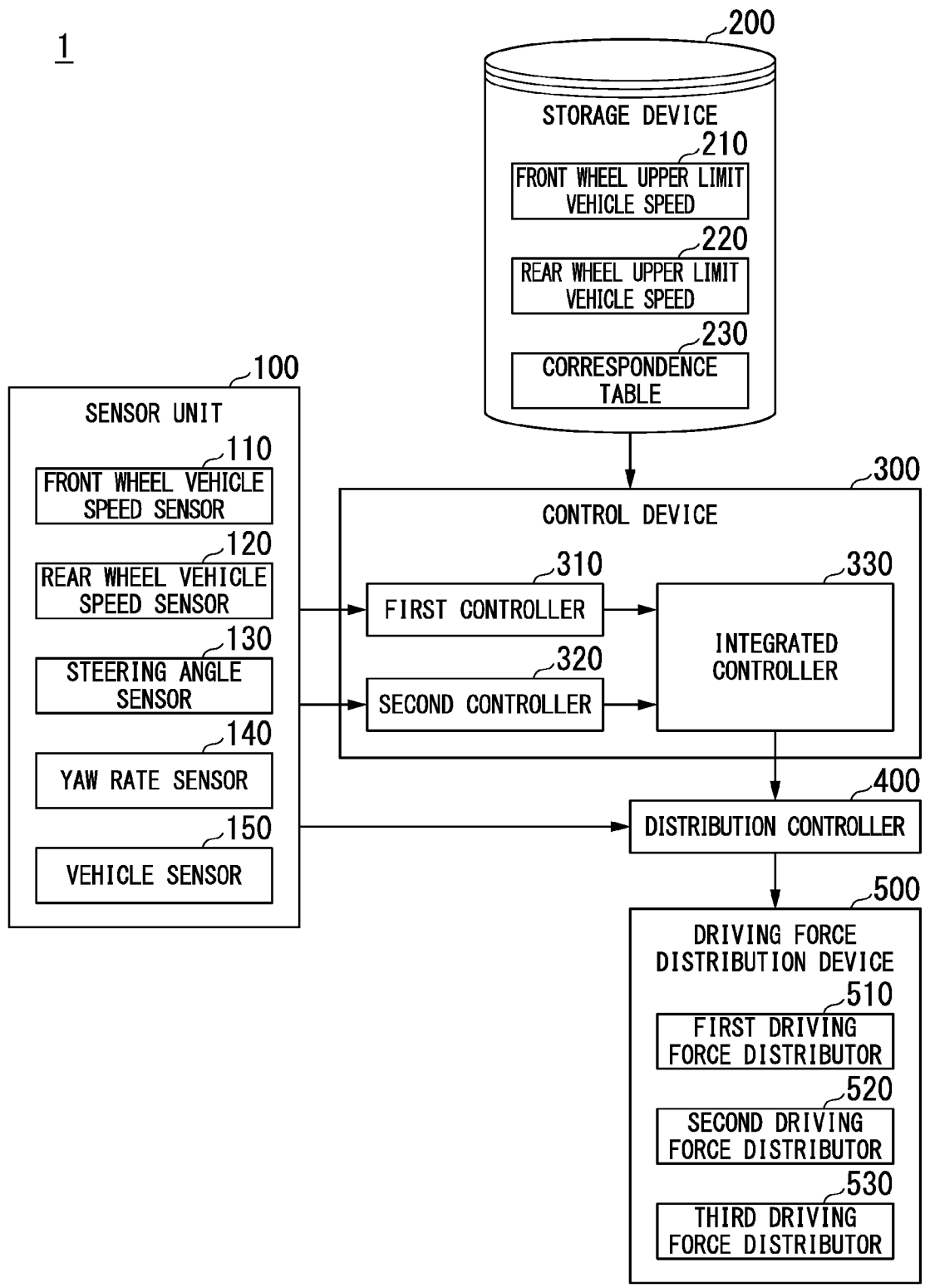
FIG. 1 is a diagram which shows an example of functional constituents of a vehicle system including a vehicle control device.

FIG. 1 is a diagram which shows an example of functional constituents of a vehicle system 1 including a vehicle control device. The vehicle system 1 is mounted in, for example, a vehicle such as a four-wheeled vehicle. In the vehicle, an internal combustion engine such as a diesel engine or a gasoline engine, an electric motor, or a combination thereof is used as a driving source. The vehicle is, for example, a four-wheel-drive vehicle in which a rotation force generated by the driving source is distributed to four front and rear wheels. The vehicle may also be a full-time four-wheel-drive or part-time four-wheel-drive vehicle.

The vehicle system 1 includes, for example, a sensor unit 100, a storage device 200, a control device 300, a distribution controller 400, and a driving force distribution device 500.

[Sensor]

The sensor unit 100 includes, for example, a front wheel vehicle speed sensor 110, a rear wheel vehicle speed sensor 120, a steering angle sensor 130, a yaw rate sensor 140, and a vehicle sensor 150.

The front wheel vehicle speed sensor 110 is attached to front wheels of the vehicle and detects a vehicle speed (wheel speed) of the front wheels on the basis of a rotational speed of the front wheels. The rear wheel vehicle speed sensor 120 is attached to rear wheels of the vehicle and detects a vehicle speed (wheel speed) of the rear wheels on the basis of a rotational speed of the rear wheels.

The steering angle sensor 130 is provided on a steering axis and detects a rotational angle of the steering axis. The yaw rate sensor 140 detects an angular speed around a vertical axis.

The vehicle sensor 150 includes a speed sensor that detects a speed of a vehicle body, a two-axis or three-axis acceleration sensor that detects acceleration, a direction sensor that detects a direction of the vehicle, an inclination sensor that detects an inclination of a road on which the vehicle travels, and the like.

[Storage Device]

A storage device 200 is realized by, for example, an HDD, a flash memory, an electrically erasable programmable read only memory (EEPROM), a read only memory (ROM), a random access memory (RAM), or the like. The storage device 200 stores information indicating an upper limit vehicle speed of the front wheels (a front wheel upper limit vehicle speed 210 in FIG. 1), information indicating an upper limit vehicle speed of the rear wheels (a rear wheel upper limit vehicle speed 220 in FIG. 1), a correspondence table 230, and the like. The correspondence table 230 will be described below.

[Control Device]

The control device 300 includes, for example, a first controller 310, a second controller 320, and an integrated controller 330. The first controller 310, the second controller 320, and the integrated controller 330 may be realized by, for example, a hardware processor such as a central processing unit (CPU) executing a program (software). Some or all of these components may be realized by hardware (a circuit; circuitry) such as a large scale integration (LSI), an application specific integrated circuit (ASIC), a field-programmable gate array (FPGA), and a graphics processing unit (GPU), or may be realized by software and hardware in cooperation. The program may be stored in advance in a storage device such as an HDD or a flash memory of the storage device 200, or may be stored in a detachable storage medium such as a DVD or a CD-ROM and installed in the HDD or the flash memory of the storage device 200 by attaching the storage medium to a drive device.

[First Controller]

The first controller 310 performs, for example, first control (front and rear LSD control (limited slip differential control)). The first controller 310 controls a driving force to be distributed to the front wheels and the rear wheels such that the rotational speed of the front wheels and the rotational speed of the rear wheels are substantially the same. The first controller 310 calculates a speed difference between the rotational vehicle speed of the front wheels and the rotational vehicle speed of the rear wheels on the basis of a result of detection by the front wheel vehicle speed sensor 110 and a result of detection by the rear wheel vehicle speed sensor 120. The first controller 310 calculates, for example, a first operation amount in accordance with the driving force to be distributed to the front wheels and the rear wheels such that the calculated speed difference approximates a set value. The first operation amount may also be an operation amount derived by the first controller 310 on the basis of a map set in advance, or the like.

Figure 2:
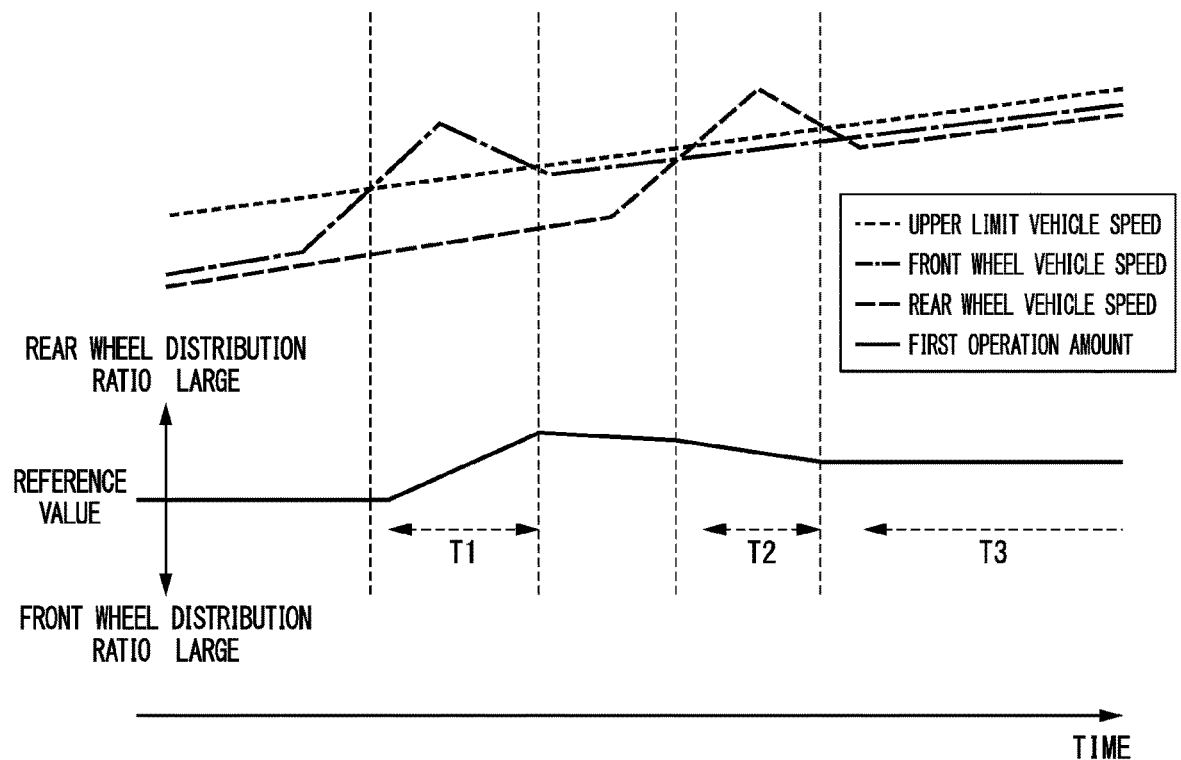
FIG. 2 is a diagram for describing control of a first controller.

FIG. 2 is a diagram for describing control of the first controller 310. A transition line of FIG. 2 shows temporal transition of the upper vehicle speed, the vehicle speed of the front wheels, the vehicle speed of the rear wheels, and the first operation amount. For example, as shown at a time T1, when the vehicle speed of the front wheels has exceeded a predetermined upper limit vehicle speed, the first controller 310 calculates the first operation amount such that a rear wheel distribution ratio is larger than a rear wheel distribution ratio before the time T1. As a result, the vehicle speed of the front wheels is lower than the upper limit vehicle speed after the time T1, and the vehicle speed of the front wheels approximates the vehicle speed of the rear wheels.

For example, as shown at a time T2 after the time T1, when the vehicle speed of the rear wheels has exceeded the upper limit vehicle speed, the first controller 310 calculates the first operation amount such that the rear wheel distribution ratio is lower than the rear wheel distribution ratio before the time T2. As a result, the vehicle speed of the rear wheels is lower than the upper limit vehicle speed, and the vehicle speed of the rear wheels approximates the vehicle speed of the front wheels after the time T2.

For example, as shown at a time T3 after the time T2, when the vehicle speed of the front wheels and the vehicle speed of the rear wheels are lower than the upper limit vehicle speed and a difference between the vehicle speed of the front wheels and the vehicle speed of the rear wheels is equal to or lower than a threshold value, the first controller 310 calculates the first operation amount in accordance with the driving force distributed to the front wheels and the rear wheels such that this state is maintained. That is, the driving force distribution ratio is maintained at a constant level as shown in FIG. 2.

[Second Controller]

A second controller 320 performs, for example, second control (yaw rate feed back (FB) control). In the present embodiment, the "first control (first driving force control)" is front and rear LSD control. The "second control (second driving force control)" will be described as yaw rate FB control, but the "first control (first driving force control)" may be the yaw rate FB control, and the "second control (second driving force control)" may be the front and rear LSD control instead.

The second controller 320 controls the driving force to be distributed to the front wheels and the rear wheels to suppress an understeer tendency or an oversteer tendency. The second controller 320 determines a state of the vehicle using a result of detection by the steering angle sensor 130 and a result of detection by the yaw rate sensor 140, and calculates a second operation amount that is the driving force to be distributed to the front wheels and the rear wheels on the basis of a result of the determination. The vehicle is a state in which the vehicle has an understeer tendency or a state in which the vehicle has an oversteer tendency.

The understeer tendency is a state in which, when a vehicle turns in a steady circle with a given driving force and a given steering angle, a grounding friction force of the front wheels is equal to or less than a centrifugal force, the front wheels tend to sideslip, and the direction of the vehicle is inclined toward an outer side. The oversteer tendency is a state in which, when a vehicle turns in the steady circle with a given driving force and a given steering angle, the grounding friction force of the rear wheels is equal to or less than the centrifugal force, the rear wheels tend to sideslip, and the direction of the vehicle is inclined toward an inner side.

The second controller 320 determines, for example, the state of a vehicle on the basis of equation (1) below. "βf" indicates a sideslip angle of the front wheels, and "βr" indicates a sideslip angle of the rear wheels. "δ" indicates an actual steering angle, and "L" indicates a wheelbase that is a distance between the front wheels and the rear wheels. "Ψ" indicates a yaw rate, and "V" indicates a vehicle speed of the vehicle body.

$$\beta f - \beta r = \delta - (L \times \Psi / V) \quad (1)$$

In (1) described above, the second controller 320 determines that is the understeer tendency when "βf−βr>0," and determines that it is the oversteer tendency when "βf−βr<0." Hereinafter, βf−βr is referred to as "βd."

Figure 3:
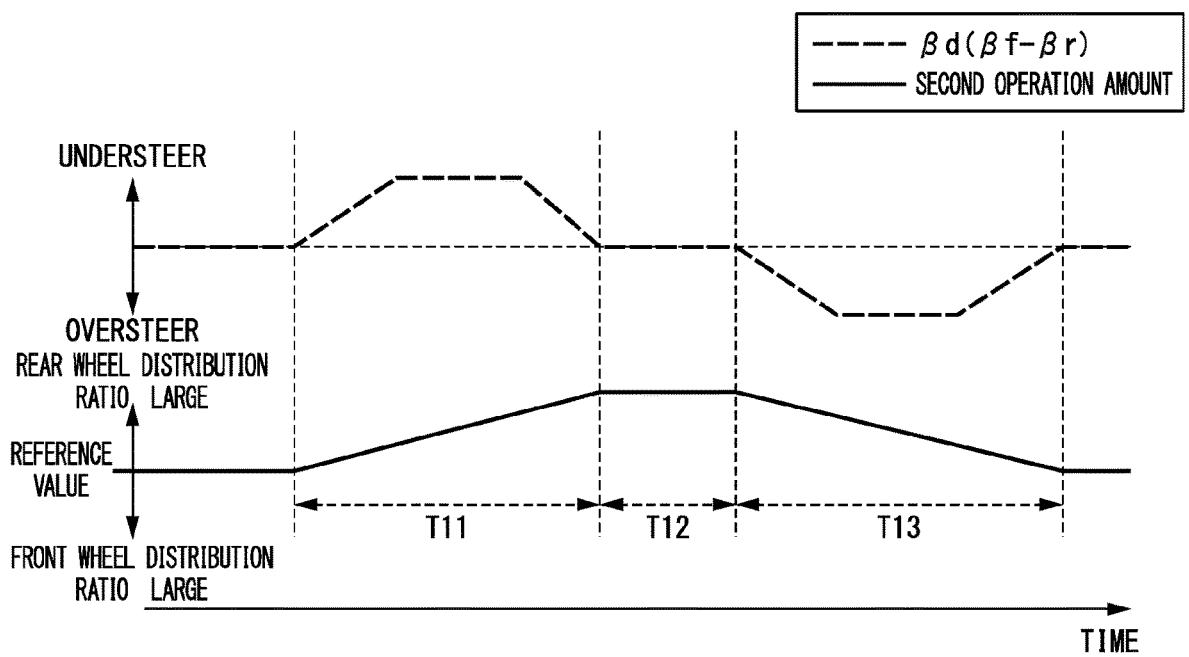
FIG. 3 is a diagram for describing control of a second controller.

FIG. 3 is a diagram for describing the control of the second controller 320. A transition line of FIG. 3 indicates "βd" and a temporal transition of the second operation amount. For example, in time T11, when the state of a vehicle has an understeer tendency, the second controller 320 calculates the second operation amount such that, with respect to a distribution of the driving force, the distribution to the rear wheels is greater than the distribution to the rear wheels before a time T11. As a result, the understeer tendency is suppressed at a time T12 after the time T11.

For example, at a time T13 after the time T12, when the state of a vehicle has an oversteer tendency, the second controller 320 calculates a second operation amount such that the distribution of a driving force to the front wheels is larger than the distribution to the front wheels at the time T12. As a result, the oversteer tendency is suppressed after the time T13. The second operation amount may also be an operation amount derived by the second controller 320 on the basis of a map set in advance.

[Integrated Controller]

The integrated controller 330 controls the vehicle on the basis of one or both of the first operation amount and the second operation amount. Details of processing by the integrated controller 330 will be described below. A function of the integrated controller 330 may be included in the first controller 310 or the second controller 320.

The distribution controller 400 controls, for example, the driving force distribution device 500 on the basis of a result of the processing by the integrated controller 330. The distribution controller 400 may also control the driving force distribution device 500 in consideration of a result of detection by a sensor included in the sensor unit 100 in addition to the result of the processing by the integrated controller 330. The distribution controller 400 may control a driving source and a brake device as well as the driving force distribution device 500.

The driving force distribution device 500 includes, for example, a first driving force distributor 510, a second driving force distributor 520, and a third driving force distributor 530. The first driving force distributor 510 transmits a driving force output by the driving source to a right wheel rotation axis of the front wheels and a left wheel rotation axis of the front wheels. The first driving force distributor 510 has function of controlling the rotation of the right wheel rotation axis and the rotation of the left wheel rotation axis. The first driving force distributor 510 controls rotation of right wheels and rotation of left wheels by controlling the rotation of the right wheel rotation axis or the rotation of the left wheel rotation axis on the basis of control of the distribution controller 400. The second driving force distributor 520 transmits a driving force output by the driving source to the right wheel rotation axis of the rear wheels and the left wheel rotation axis of the rear wheels. The second driving force distributor 520 has the same function as the first driving force distributor 510, and therefore the description thereof will be omitted.

The third driving force distributor 530 transmits a driving force output by the driving source to the front wheel rotation axis and the rear wheel rotation axis. The third driving force distributor 530 has a function of controlling the rotation of the front wheel rotation axis and the rotation of the rear wheel rotation axis. The third driving force distributor 530 controls the rotation of the front wheels and the rotation of the rear wheels by controlling the rotation of the front wheel rotation axis or the rotation of the rear wheel rotation axis on the basis of the control of the distribution controller 400.

Specific Example 1

Figure 4:
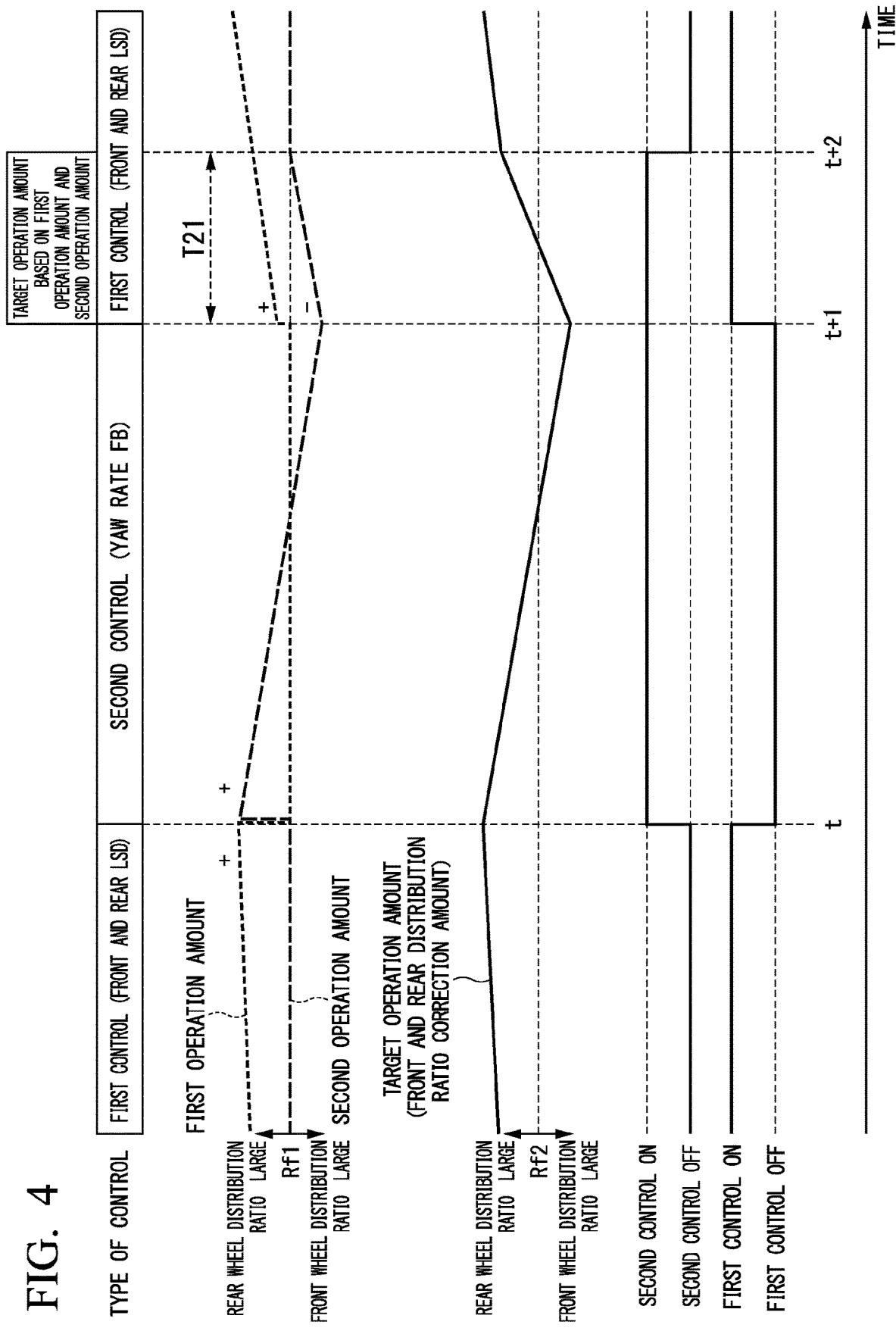
FIG. 4 is a diagram (part 1) for describing content of processing of an integrated controller.

FIG. 4 is a diagram (part 1) for describing content of the processing of the integrated controller 330. In FIG. 4, a transition line of the first operation amount, a transition line of the second operation amount, a transition line of a target operation amount, a control line indicating whether the first control is executed, and a control line indicating whether the second control is executed are shown. The horizontal axis in FIG. 4 indicates time.

The time t is a timing at which the first control is switched to second control. The time t shows that both signs indicating the bias of the distribution ratio of the operation amount (a sign of the operation amount) indicate "+." That is, it is a timing at which the sign indicating the bias of the distribution ratio of the first operation amount and the sign indicating the bias of the distribution ratio of the second operation amount are the same. The sign "+" means that the distribution ratio of the driving force is biased or is concentrated toward a rear wheel distribution ratio side from the reference value Rf1 (a result of calculation by an FF calculator 350 to be described below). The reference value Rf1 is, for example, a value whose operation amount is zero. A "−" sign means that the distribution ratio of the driving force is biased or is concentrated toward a front wheel distribution ratio side from the reference value Rf1.

At the time t, when signs of the first operation amount and the second operation amount are "+" (when the signs are the same), a succession between the first operation amount and the second operation amount is performed as shown. "Succession" means that the first operation amount is set to an initial value of the second operation amount when the first operation amount is switched to the second operation amount.

In other words, the integrated controller 330 sets the first operation amount as an initial value of the second operation such that the succession is smoothly performed between the first operation amount and the second operation amount at a timing at which the first control is switched to the second control.

A time t+1 is a timing at which the second control is switched to the first control. The time t+1 is a timing at which the sign of the first operation amount is "+," and the sign of the second operation amount is "−" (a timing at which the sign indicating the bias of the distribution ratio of the first operation amount is different from the sign indicating the bias of the distribution ratio of the second operation amount). In this manner, when the signs of the operation amounts are different, the vehicle is controlled on the basis of the first operation amount and the second operation amount.

During a predetermined time (a time T21) between the time t+1 and a time t+2, as shown in FIG. 4, the integrated controller 330 causes the second operation to be changed to zero in the predetermined time (or during the predetermined time), causes the first operation to be increased to a target operation amount in the predetermined time (or during the predetermined time) and controls the vehicle on the basis of the first operation amount and the second operation amount during the predetermined time. For example, the integrated controller 330 controls the vehicle on the basis of the target operation amount that is a sum of the first operation amount and the second operation amount. Then, the target operation amount is the target operation amount of the first control at the time t+2.

Since the predetermined time has elapsed as shown in FIG. 4 at the time t+2, the integrated controller 330 controls the vehicle on the basis of the first operation amount.

As described above, the control device 300 performs the succession between the first operation amount and the second operation amount or controls the vehicle on the basis of the first operation amount and the second operation amount, thereby controlling the vehicle with higher accuracy while stabilizing a posture of the vehicle.

Specific Example 2

Figure 5:
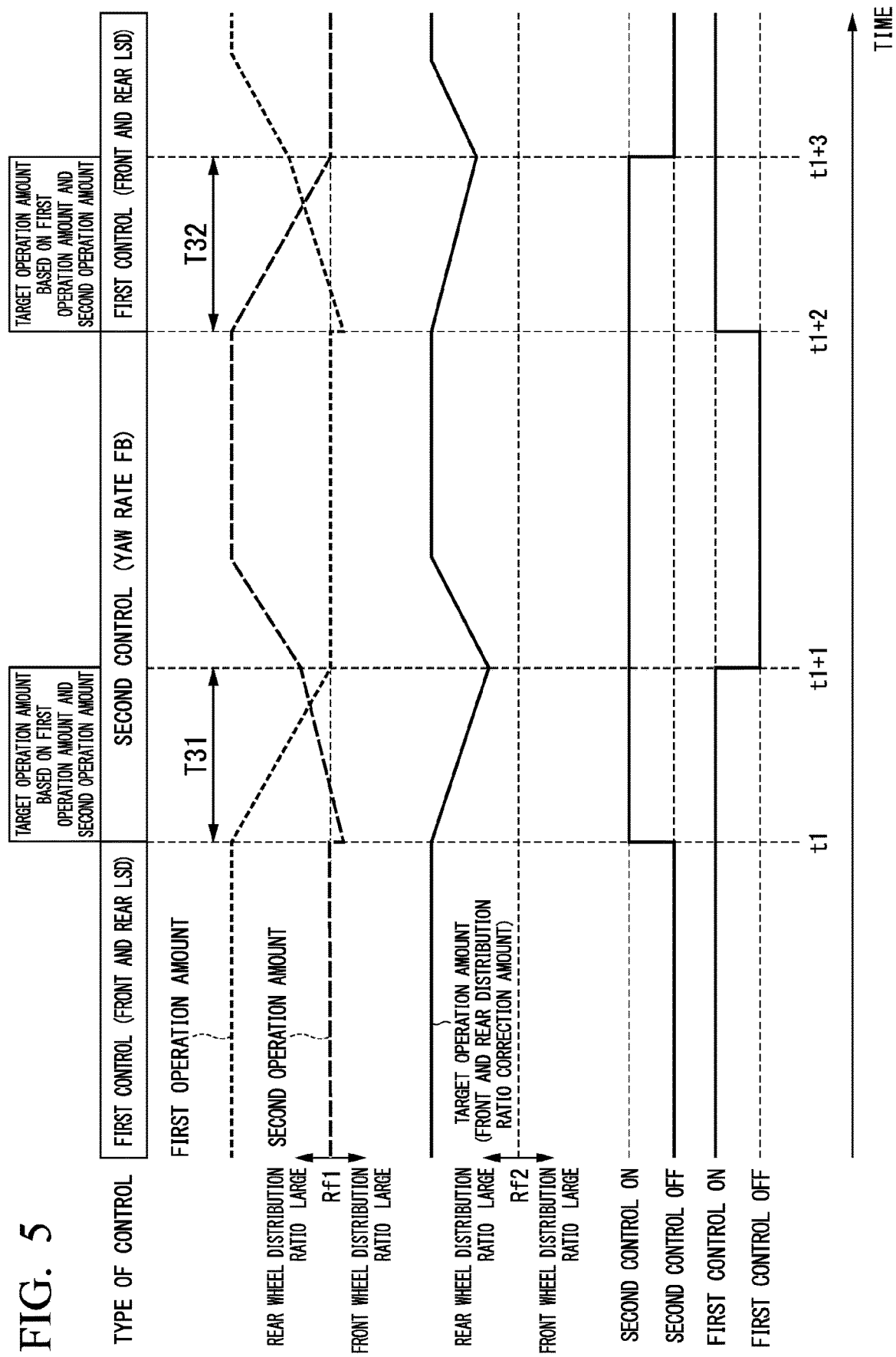
FIG. 5 is a diagram (part 2) for describing the content of the processing of the integrated controller.

FIG. 5 is a diagram (part 2) for describing the content of the processing of the integrated controller 330. The differences from the diagram in FIG. 4 will be described below.

The time t1 is a timing for switching from the first control to the second control. The time t1 is a timing at which a sign of the first operation amount is "+" and a sign of the second operation amount is "−."

During a predetermined time (time T31) from the time t1 to a time t1+1, the integrated controller 330 causes the first operation amount to be changed to zero in the predetermined time (or during the predetermined time), causes the second operation amount to be increased to the target operation amount in the predetermined time (or during the predetermined time), and controls the vehicle on the basis of the first operation amount and the second operation amount during the predetermined time. For example, the integrated controller 330 controls the vehicle on the basis of the target operation amount that is a sum of the first operation amount and the second operation amount. Then, the target operation amount is a target operation amount of the second control at the time t1+1. As shown in FIG. 5, the first operation amount transits in a direction from a sign "+" to a sign "−" (toward the reference value Rf1), and in contrast, the second operation amount transits in a direction from the sign "−" to the sign "+" (away from the reference value Rf1).

At the time t1+1, since the predetermined time has elapsed as shown in FIG. 5, the integrated controller 330 controls the vehicle on the basis of the second operation amount.

A time t1+2 is a timing at which the second control is switched to the first control. The time t1+2 is a timing at which the sign of the first operation amount is "−" and the sign of the second operation is "+." The integrated controller 330, during a predetermined time (a time T32) from the time t1+2 to the time t1+3, causes the second operation amount to be changed to zero in the predetermined time (or during the predetermined time), causes the first operation amount to be increased to the target operation amount in the predetermined time (or during the predetermined time), and controls the vehicle on the basis of the first operation amount and the second operation amount during the predetermined time. For example, the integrated controller 330 controls the vehicle on the basis of the target operation amount that is a sum of the first operation amount and the second operation amount. Then, the target operation amount is the target operation amount of the first control at the time t1+3. At the time t1+2, as shown in FIG. 5, the second operation amount transits in a direction from the "+" sign to the "−" sign (toward the reference value Rf1), and in contrast, the first operation amount transits in a direction from the "−" sign (the reference value Rf1) to the "+" sign (away from the reference value Rf1).

At the time t1+3, since the predetermined time has elapsed as shown in FIG. 5, the integrated controller 330 controls the vehicle on the basis of the first operation amount.

As described above, when the integrated controller 330 switches from one driving force control to the other driving force control, and when the sign indicating the bias of the distribution ratio of the operation amount of one driving force control is different from the sign indicating the bias of the distribution ratio of the operation amount of the other driving force control, the integrated controller 330 causes the operation amount of the one driving force control to be changed to zero in a predetermined time (or during the predetermined time), causes the operation amount of the other driving force control to be increased to a target operation amount in the predetermined time (or during the predetermined time), and controls the vehicle on the basis of the first operation amount and the second operation amount, thereby controlling the vehicle with higher accuracy while stabilizing the posture of the vehicle.

[Calculation of Control Amount]

Figure 6:
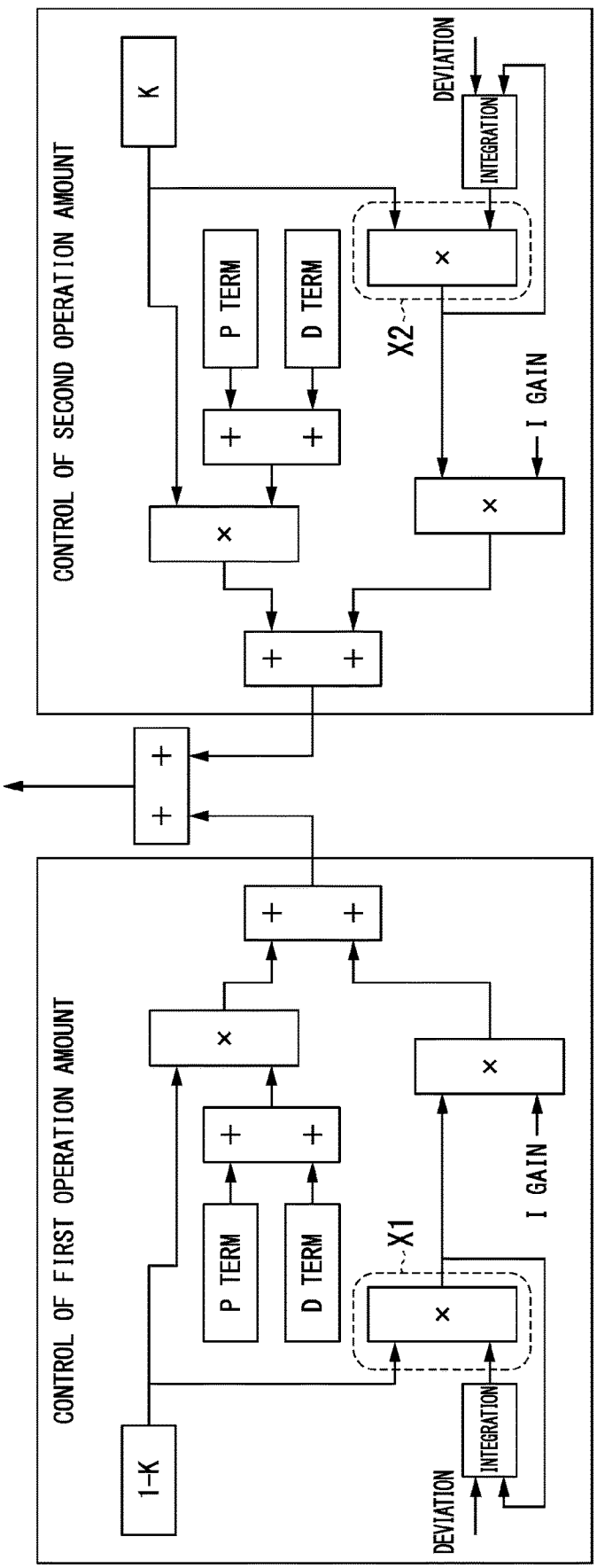
FIG. 6 is a diagram which shows an example of processing in which a control device calculates a target operation amount.

FIG. 6 is a diagram which shows an example of processing in which the control device 300 calculates a target operation amount. For example, control at the time T31 will be described as an example. "k" in FIG. 6 is a value that changes from zero to one between a beginning and end of the time T. The control device 300 calculates a target operation amount on the basis of PID control. For example, the control device 300 calculates the first operation amount as follows. The control device 300 adds a value of a P term and a value of a D term and multiplies the result by "1−k." This product is referred to as a first index. The control device 300 multiplies a value of "1−k" by a value of an I term, and multiplies the result (the product) by an I gain. This product is referred to as a second index. The product described above is fed back to the I term and the value of the I term is adjusted such that there is no deviation. Then, the control device 300 adds the first index and the second index, and calculates a third index. For example, the control device 300 calculates the second operation amount in the same manner as the processing for the first operation amount. However, in the calculation of the second operation amount, "k" is used instead of "1−k." Then, the control device 300 adds the first operation amount and the second operation amount to calculate a target operation amount.

[Modification of Specific Example 2]

The control device 300 may change a predetermined time for controlling the vehicle on the basis of the first operation amount and the second operation amount in accordance with the vehicle speed. If the vehicle speed is high, a downforce is large, a margin is large for a front and rear G of the vehicle, and otherwise, the centrifugal force is large, and the margin for a left and right G thereof is small. When the vehicle speed is low, the driving force is large and wheel spin is likely to occur. In consideration of this, as shown in the following description, the predetermined time may also be changed in accordance with the vehicle speed.

The time T31 shown in FIG. 5 described above may be short if the vehicle speed is high. If the vehicle speed is high, a centrifugal force is generated even when the operation amount of steering is small. However, since the control is quickly switched to the second control, the posture can be stabilized.

The time T31 as shown in FIG. 5 described above may be set to be long if the vehicle speed is low. Since the driving force when the vehicle speed is low tends to be relatively large, wheel spin is likely to occur. Since the centrifugal force generated by the steering operation is smaller than when the vehicle speed is high, the control based on the first operation amount and the second operation amount is performed longer than when the vehicle speed is high to give priority to securing the driving force.

The time T32 shown in FIG. 5 described above may also be set to be long if the vehicle speed is high. If the vehicle speed is high, the centrifugal force is generated even when the operation amount of steering is small. When the vehicle travels on continuous curves and corners, and the like, control time on the basis of the first operation amount and the second operation amount is extended by making it difficult to transit to the first control at the time of occurrence of a neutral state with the steering angle near zero, and thereby the posture of the vehicle is stabilized.

The time T32 as shown in FIG. 5 described above may also be set to short if the vehicle speed is low. If the vehicle speed is low, the driving force tends to be relatively large, and thus wheel spin is likely to occur. For this reason, the driving force is ensured by causing it to quickly transit to the first control.

As described above, the control device 300 can further stabilize the vehicle by changing the predetermined time according to the vehicle speed.

Specific Example 3

Figure 7:
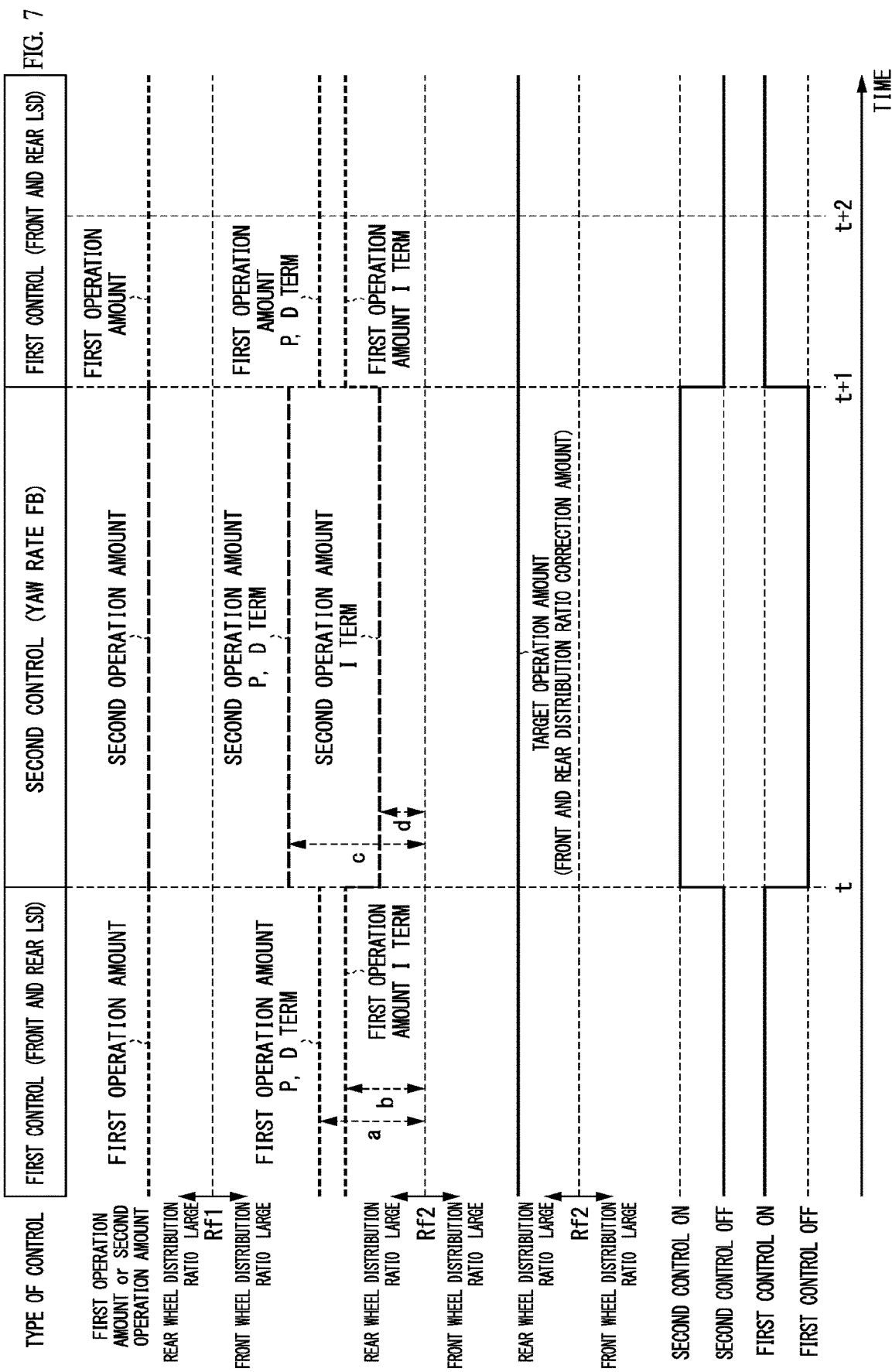
FIG. 7 is a diagram (part 3) for describing the content of the processing of the integrated controller.

FIG. 7 is a diagram (part 3) for describing the content of the processing of the integrated controller 330. Differences from FIG. 4 will be described. FIG. 7 further shows a PD term value and an I term value of the first operation amount and a PD term value and an I term value of the second operation amount.

When the sign of the first operation amount and the sign of the second operation amount are the same, the control device 300 performs a succession between the first operation amount and the second operation amount.

For example, the control device 300 sets a value (d in FIG. 7) obtained by subtracting a current PD term value (c in FIG. 7) from a previous operation amount (a+b in FIG. 7) to an I term at a timing at which first control is switched to second control. As a result, as shown in FIG. 7, the first operation amount and the second operation amount are succeeded without a gap, and the target operation amount is smooth.

As described above, the integrated controller 330 performs the succession such that no gap occurs between the first operation amount and the second operation, and thereby it is possible to suppress a sense of incongruity from being given to an occupant.

[Calculation of Operation Amount]

Figure 8:
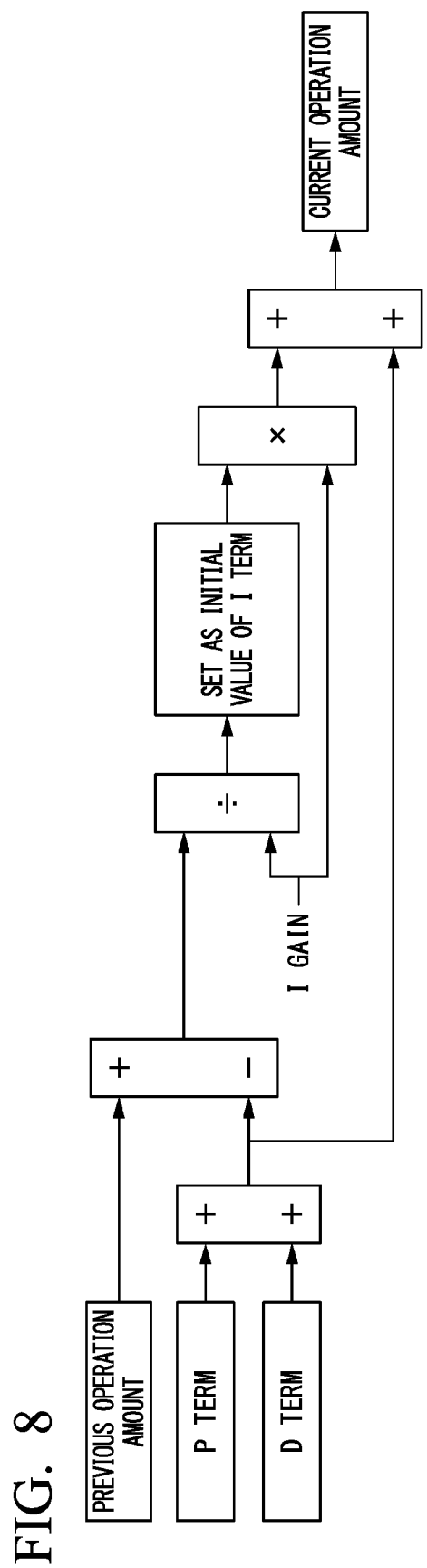
FIG. 8 is a diagram which shows an example of processing in which the control device calculates a target operation amount in a specific example 3.

FIG. 8 is a diagram which shows an example of processing in which the control device 300 calculates a target operation amount in a specific example 3. The control device 300 subtracts the sum of the value of the P term and the value of the D term from a value of a previous operation amount. A value obtained by this subtraction is referred to as a "difference." The control device 300 divides the difference by an I gain. This quotient is set as an initial value of an I term. Then, the control device 300 multiplies the initial value of the I term and the I gain, and further adds the sum of the value of the P term and the value of the D term to that product. This value corresponds to a current operation amount.

Comparative Example

Figure 9:
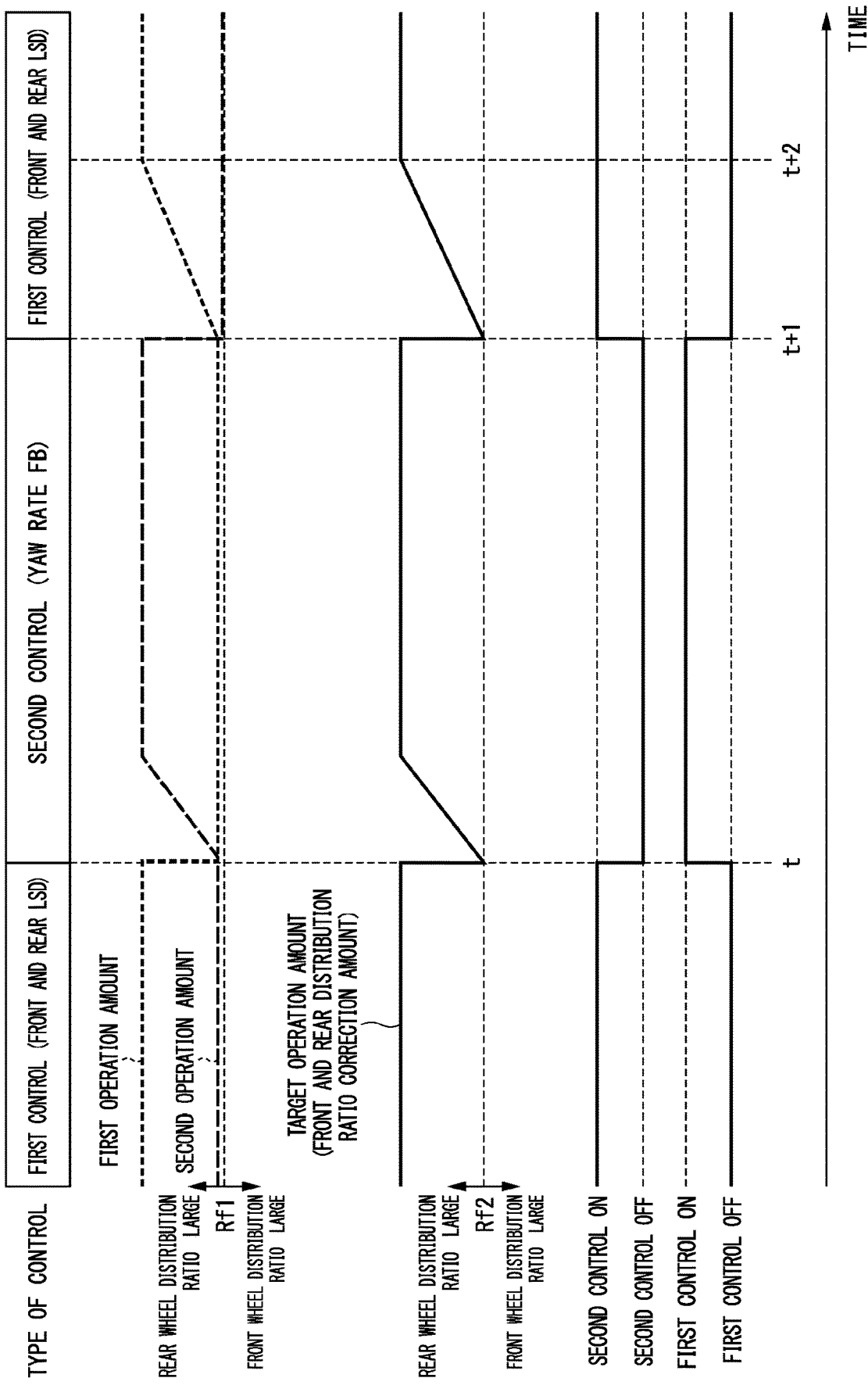
FIG. 9 is a diagram for describing processing of the control device in a comparative example.

FIG. 9 is a diagram for describing processing of the control device in a comparative example. For example, at a time t that is a timing at which the first control is switched to the second control, the control device in the comparative example does not perform the succession between the first operation amount and the second operation amount as shown. For this reason, a change in operation amount may be large, a control degree of the vehicle may be largely changed or an occupant may be given a sense of incongruity.

On the other hand, as described above, the control device of the present embodiment performs the succession between the first operation amount and the second operation amount or calculates the operation amount by integrating the first operation amount and the second operation amount, thereby suppressing the change in operation amount and stabilizing the state of a vehicle. As a result, the control device 300 can control the vehicle with higher accuracy.

According to the first embodiment described above, when one driving force control is switched to the other driving force control, and when the sign indicating a bias of the distribution ratio of the operation amount of one driving force control and the sign indicating a bias of the distribution ratio of the operation amount of the other driving force control are different from each other, the control device 300 causes the operation amount of the one driving force control to change to zero in a predetermined time (or during the predetermined time), causes the operation amount of the other driving force control to increase to a target operation amount in the predetermined time (or during the predetermined time), and controls the driving force of the vehicle on the basis of the operation amount of the one driving force control and the operation amount of the other driving force control during the predetermined time, thereby controlling the vehicle with higher accuracy.

Second Embodiment

Hereinafter, a second embodiment will be descried. In the second embodiment, control to be adopted is determined in accordance with the state (acceleration, turning amount (steering angle)) of a vehicle. Hereinafter, differences from in the first embodiment will be described.

[Comparison Between First Control Area and Second Control Area]

Figure 10:
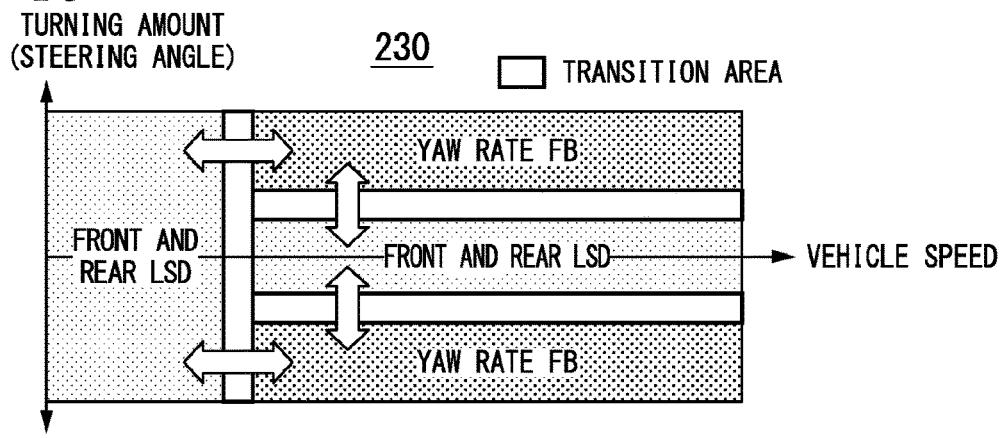
FIG. 10 is a diagram which shows an example of a correspondence table 230 that indicates a first control area, a second control area, and a transition area.

FIG. 10 is a diagram which shows an example of the correspondence table 230 that indicates a first control area, a second control area, and a transition area. The transition area may also be omitted. For example, in the correspondence table 230, the first control area and the second control area are associated with the turning amount (steering angle) and the vehicle speed. For example, the first control is slip suppression control for controlling the driving force when a vehicle speed is equal to or lower than a predetermined vehicle speed, or equal to or higher than the predetermined vehicle speed, and a turning amount is equal to or less than a predetermined turning amount. The second control is posture stabilization control for controlling the driving force when the vehicle speed is equal to or higher than a predetermined vehicle speed or the turning amount is equal to or greater than a predetermined tuning amount. The transition area is associated with a boundary between the first control and the second control.

In the correspondence table 230, an area with which the transition area is associated is an area in which the signs of the first operation amount and the second operation amount are different.

Figure 11:
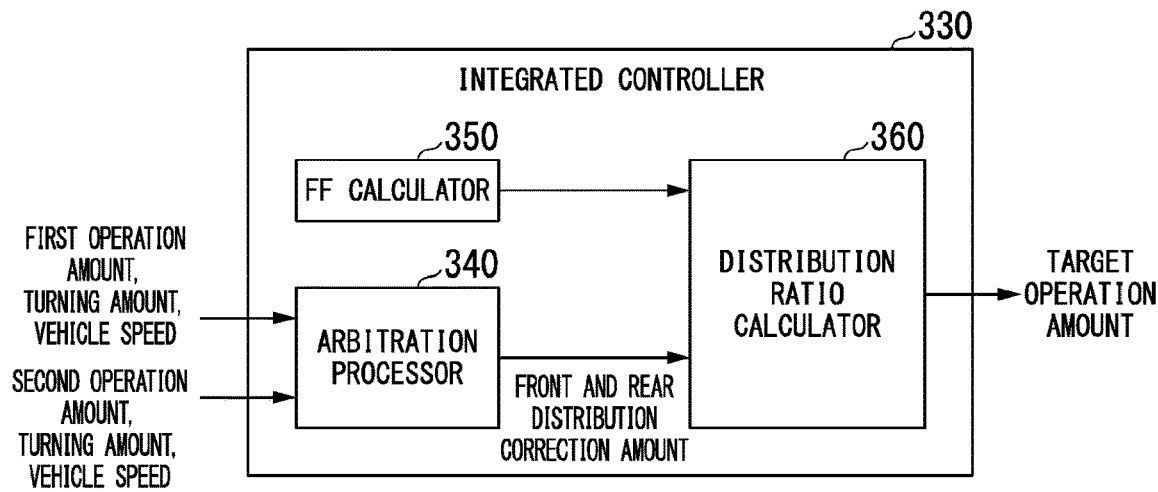
FIG. 11 is a diagram which shows an example of a functional unit included in an integrated controller of a second embodiment.

FIG. 11 is a diagram which shows an example of a functional unit included in the integrated controller 330 of the second embodiment. The integrated controller 330 includes, for example, an arbitration processor 340, an FF calculator 350, and a distribution ratio calculator 360.

The arbitration processor 340 refers to the correspondence table 230, and determines whether to adopt the first control or the second control on the basis of the turning amount and the vehicle speed. Then, the arbitration processor 340 outputs the calculated front and rear distribution correction amount calculated on the basis of adopted control to the distribution ratio calculator 360. For example, this front and rear distribution correction amount is a correction amount calculated on the basis of the first operation amount or the second operation amount that is an operation amount of the adopted control.

In the transition area, as descried in the first embodiment, the arbitration processor 340 may calculate the front and rear distribution correction amount on the basis of the first operation amount and the second operation amount, and may select one of the first operation amount and the second operation amount by performing arbitration on the basis of a predetermined standard and calculate the front and rear distribution correction amount on the basis of a result of the selection.

[FF Calculator]

Figure 12:
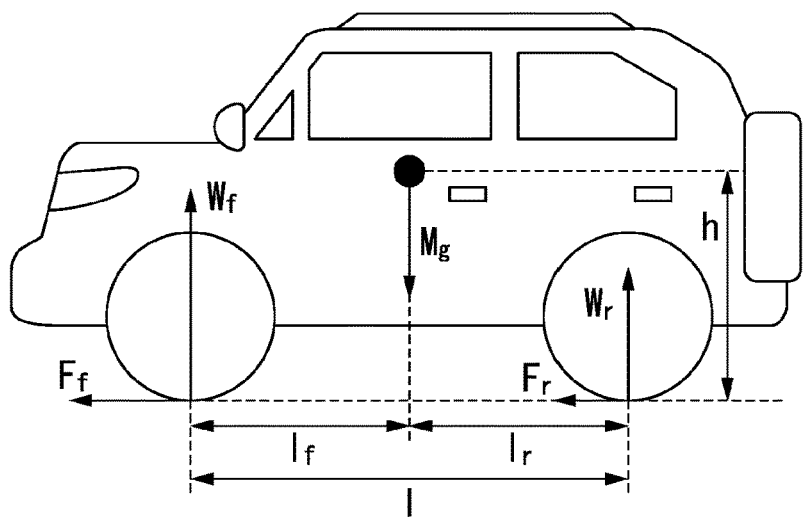
FIG. 12 is a diagram for describing a calculation of an FF term.

FIG. 12 is a diagram for describing a calculation of an FF term. The FF calculator 350 calculates a feedforward term (FF term) as follows. As shown in FIG. 12, Mg is gravity, Wf is a front wheel normal force, Wr is a rear wheel normal force, Ff is a front wheel driving force, Fr is a rear wheel driving force, M is a vehicle body weight, h is a height of the center of gravity, and l is a wheelbase.

Mg is calculated according to Equation (2) using a balance of a force in a vertical direction.

$$W_f + W_r = Mg \tag{2}$$

If a front and rear acceleration is set to α, Equation (3) is established based on an equation of motion.

$$F_f + F_r = M\alpha \tag{3}$$

Equation (4) is established based on a balance of moments about a center of gravity.

$$W_f l_f + F_f h = W_r l_r - F_r h \tag{4}$$

Equation (5) is calculated by substituting Equations (2) and (3) into Equation (4) and solving for Wr.

$$W_r = Mg \cdot \frac{l_f}{l} + M\alpha \cdot \frac{h}{l} \tag{5}$$

According to the above description, a rear dynamic load ratio Kr is expressed by Equation (6). "$l_f/l$" is a static load ratio, and "a/g·h/l" is acceleration correction.

$$K_r = \frac{W_r}{Mg} = \frac{l_f}{l} + \frac{\alpha}{g} \cdot \frac{h}{l} \tag{6}$$

Then, the FF calculator 350 calculates the front and rear distribution ratio on the basis of the rear dynamic load ratio Kr and a correction gain. The correction gain is a gain based on a standard slip angle, a vehicle body speed, and other criteria. The correction gain is calculated on the basis of a predetermined table.

The distribution ratio calculator 360 calculates a front and rear distribution ratio on the basis of a front and rear distribution correction amount and a result of calculation using the FF calculator 350 and outputs a result of the calculation to the distribution controller 400.

According to the second embodiment described above, since the integrated controller 330 calculates the front and rear distribution ratio on the basis of a result of the calculation by the FF calculator 350 and a result of the processing by the arbitration processor 340, it is possible to control the vehicle with higher accuracy.

Third Embodiment

Hereinafter, a third embodiment will be described. In the third embodiment, a correspondence table to be used is changed in accordance with the state of a vehicle. Hereinafter, differences from the first embodiment and the second embodiment will be described.

Figure 13:
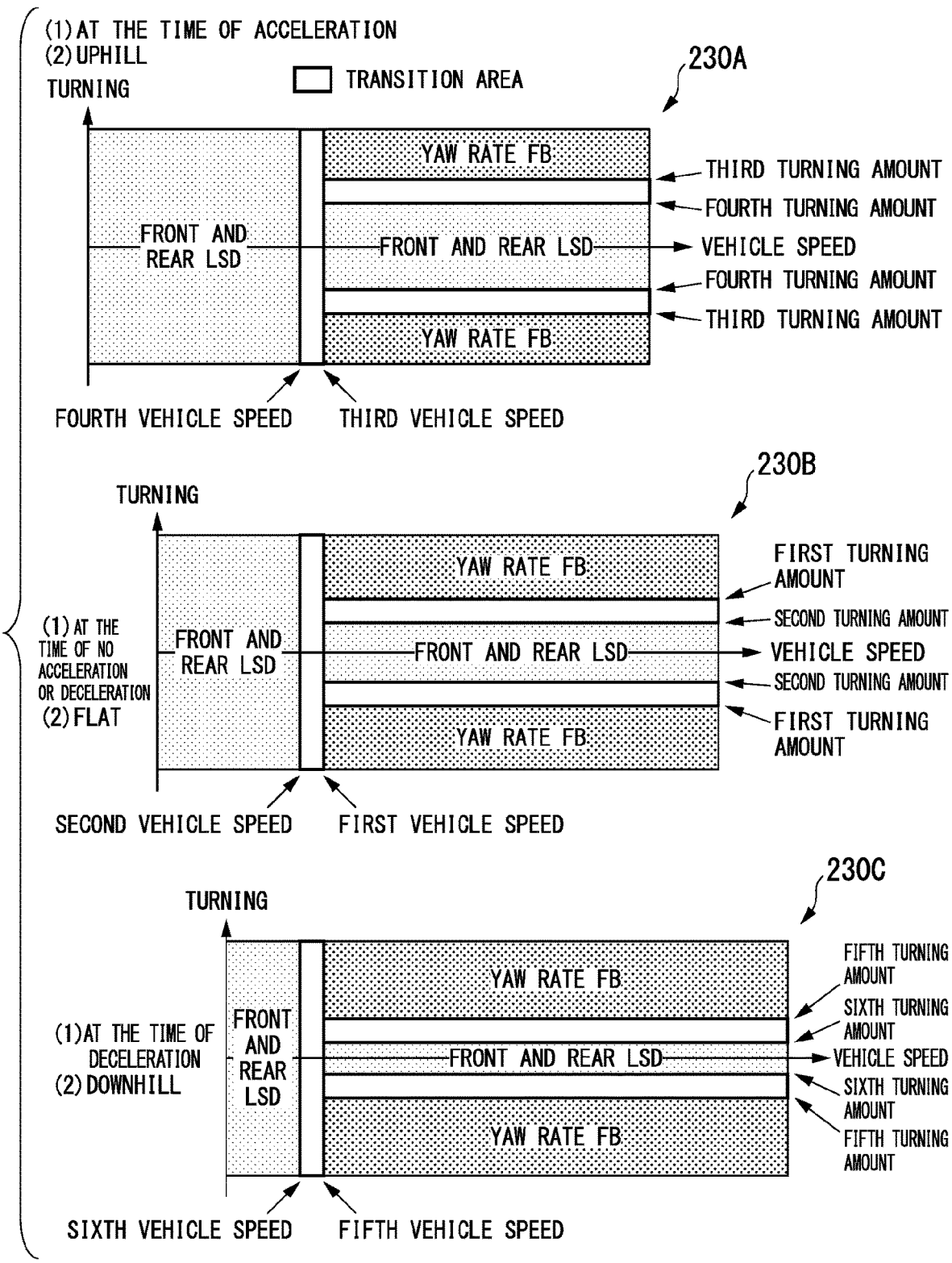
FIG. 13 is a diagram which shows an example of content of the correspondence table.

In the storage device 200 of the vehicle system 1 of the third embodiment, correspondence tables 230A to 230C are stored. FIG. 13 is a diagram which shows an example of content of the correspondence tables 230A to 230C. A correspondence table 230B has the same content as the correspondence table 230. However, a transition area may also be omitted in the correspondence tables 230A to 230C of the third embodiment.

For example, a correspondence table 230A is adopted when a degree of acceleration is equal to or greater than the first threshold value, and a correspondence table 230C is adopted when a degree of deceleration is equal to or greater than the second threshold value. When the degree of acceleration is less than the first threshold value and the degree of deceleration is less than the second threshold value, a correspondence table 230B is adopted.

When the degree of acceleration is equal to or greater than the first threshold value, the correspondence table 230A is adopted, and thereby a load on a rear side increases and a load on a front side decreases to suppress the front wheels from wheel spinning. When the degree of deceleration is less than the second threshold value, the load on a front side increases and the front wheels are less likely to spin and the oversteer tendency is likely to occur, but occurrence of this oversteer tendency is suppressed by adopting the correspondence table 230C.

When the vehicle climbs an uphill more than a first predetermined degree, the correspondence table 230A is adopted, and, when the vehicle goes down a downhill more than a second predetermined degree, the correspondence table 230C is adopted. When the vehicle travels on a flat road, when the vehicle climbs an uphill less than the first predetermined degree, or when the vehicle goes down a downhill less than the second predetermined degree, the correspondence table 230B is adopted. The control device 300 determines whether the vehicle climbs an uphill or goes down a downhill on the basis of a result of the detection of an acceleration sensor or an inclination sensor included in the vehicle sensor 150.

On an uphill, since the load on a rear side is large, wheel spin of the front wheels is suppressed by adopting the first control. On a downhill, since the load on a front side is large and the oversteer tendency is likely to occur, occurrence of this oversteer tendency is suppressed by adopting the second control.

In the correspondence table 230A, the first control area is associated with a vehicle speed higher than in the correspondence table 230B, and the first control area is associated with a turning amount larger than in the correspondence table 230B. In the correspondence table 230B, the first control area is associated with a vehicle speed higher than in the correspondence table 230C, and the first control area is associated with a turning amount larger than in the correspondence table 230C.

For example, in the correspondence table 230B, the first control is executed when the vehicle speed is equal to or lower than a first vehicle speed or exceeds the first vehicle speed, and the turning amount is equal to or less than a first turning amount. In the correspondence table 230B, the second control is executed when the vehicle speed is equal to or higher than a second vehicle speed and the turning amount is equal to or larger than a second turning amount.

In the correspondence table 230A, the first control is executed when the vehicle speed is equal to or lower than a third vehicle speed higher than the first vehicle speed, or exceeds a third vehicle speed, and the turning amount is equal to or less than a third turning amount larger than the first turning amount. In the correspondence table 230A, the second control is executed when the vehicle speed is equal to or higher than a fourth vehicle speed and the turning amount is equal to or larger than a fourth turning amount. For example, the third vehicle speed is higher than the fourth vehicle speed, and the third turning amount is larger than the fourth turning amount.

In the correspondence table 230C, the first control is executed when the vehicle speed is equal to or lower than a fifth vehicle speed lower than the first vehicle speed, or exceeds a fifth vehicle speed, and the turning amount is equal to or less than a fifth turning amount less than the first turning amount. In the correspondence table 230C, the second control is executed when the vehicle speed is equal to or higher than a sixth vehicle speed and the turning amount is equal to or larger than a sixth turning amount. For example, the fifth vehicle speed is higher than the sixth vehicle speed, and the fifth turning amount is larger than the sixth turning amount.

When different correspondence tables 230 are candidates for adoption such that the vehicle goes down a downhill while accelerating, the correspondence table 230 may be adopted based on whether the vehicle climbs an uphill or goes down a downhill instead of speed, and, on the contrary, the correspondence table 230 may be adopted based on the speed. The control device 300 may score the two criteria described above, and select the correspondence table 230 based on the scored criteria. In this case, a score is associated with each of the correspondence tables 230A and 230B.

The control device 300 of the third embodiment described above refers to the correspondence tables 230A to 230C, and determines content of control on the basis of the vehicle speed and the turning amount, thereby controlling the vehicle with higher accuracy.

[Hardware Constituent]

Figure 14:
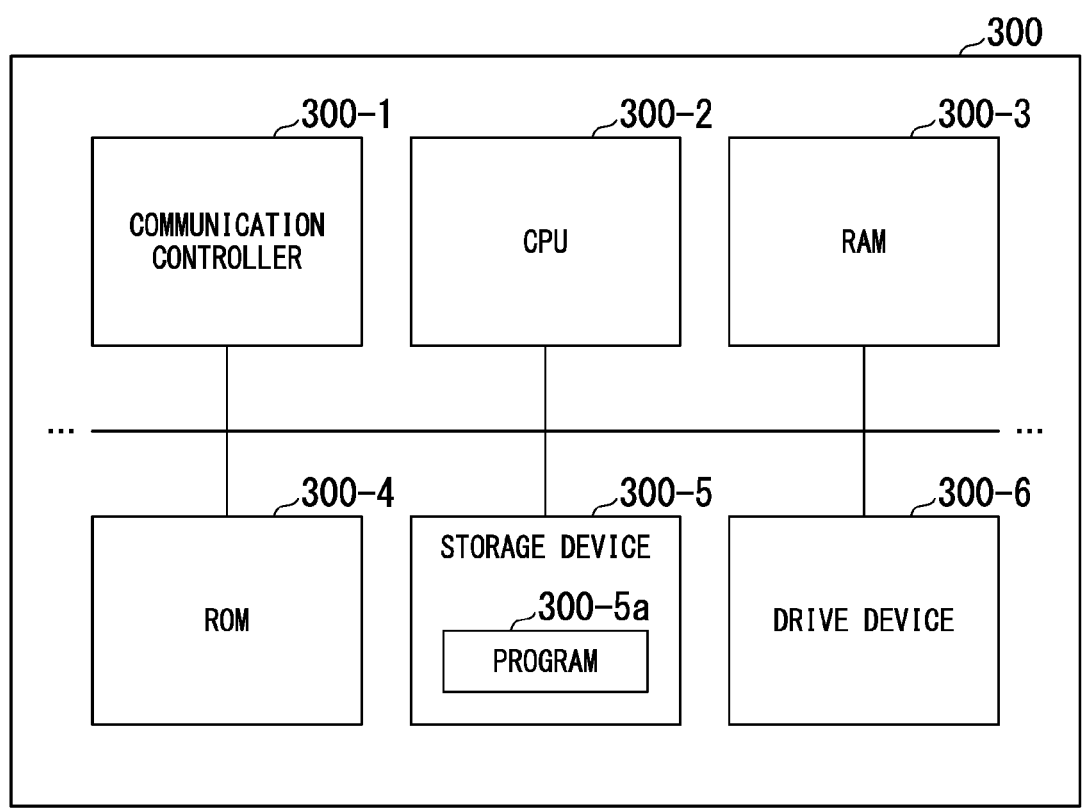
FIG. 14 is a diagram which shows an example of hardware constituents of a control device of the embodiment.

The control device 300 of the vehicle system 1 of the embodiments described above is realized by constituents of hardware as shown in FIG. 14. FIG. 14 is a diagram which shows an example of hardware constituents of the control device 300 of the embodiment.

The control device 300 is configured by a communication controller 300-1, a CPU 300-2, a RAM 300-3, a ROM 300-4, a storage device 300-5 such as a flash memory or an HDD, and a drive device 300-6 being connected by an internal bus or a dedicated communication line. A portable storage medium such as an optical disc is attached to the drive device 300-6. The control device 300 is realized by a program 300-5a stored in the storage device 300-5 being expanded in the RAM 300-3 by a DMA controller (not shown), and the like, and being executed by the CPU 300-2. A program referred to by the CPU 300-2 may be stored in the portable storage medium attached to the drive device 300-6, and may also be downloaded from another device via a network NW.

The embodiment described above can be expressed as follows.

A vehicle control system includes a storage device and a hardware processor configured to execute a program stored in the storage device, in which the hardware processor executes the program, thereby calculating a first operation amount that is a command value of a distribution ratio of a front and rear driving force of first driving force control for controlling a driving force of front and rear driving wheels of a vehicle, calculating a second operation amount that is a command value of a distribution ratio of a front and rear driving force of second driving force control for controlling a driving force of the front and rear driving wheels of the vehicle, and controlling the vehicle by switching between the first operation amount and the second operation amount on the basis of a sign indicating a bias of the distribution ratio of the first operation amount calculated by the first calculator and a sign indicating a bias of the distribution ratio of the calculated second operation amount, in which, when one of the first driving force control and the second driving force control is switched to the other driving force control and when the sign of the operation amount of one driving force control is different from the sign of the operation amount of the other driving force control, the operation amount of one driving force control is caused to be changed to zero in a predetermined time (or during the predetermined time), the operation amount of the other driving force control is caused to be increased to a target operation amount in the predetermined time (or during the predetermined time), and a driving force of the vehicle is controlled on the basis of the operation amount of one driving force control and the operation amount of the other driving force control during the predetermined time.

As described above, although forms for implementing the present invention have been described using embodiments, the present invention is not limited to such embodiments and various modifications and substitution can be made within a range not departing from the gist of the present invention.

What is claimed is:

1. A vehicle control device comprising:
   a first calculator configured to calculate a first operation amount that is a command value of a distribution ratio of a front and rear driving force of first driving force control for controlling a driving force of front and rear driving wheels of a vehicle;
   a second calculator configured to calculate a second operation amount that is a command value of a distribution ratio of a front and rear driving force of second driving force control for controlling the driving force of the front and rear driving wheels of the vehicle; and
   a controller configured to control the vehicle by switching between the first operation amount and the second operation amount on the basis of a sign indicating a bias of the distribution ratio of the first operation amount calculated by the first calculator and a sign indicating a bias of the distribution ratio of the second operation amount calculated by the second calculator,
   wherein, when one of the first driving force control and the second driving force control is switched to the other driving force control and when the sign of the operation amount of the one driving force control is different from the sign of the operation amount of the other driving force control, the controller causes the operation amount of the one driving force control to be changed to zero in a predetermined time, causes the operation amount of the other driving force control to be increased to a target operation amount in the predetermined time, and controls a driving force of the vehicle on the basis of the operation amount of the one driving force control and the operation amount of the other driving force control during the predetermined time.

2. The vehicle control device according to claim 1,
   wherein the controller causes the first operation amount to be changed to zero over the predetermined time, and causes the second operation amount to be changed to the target operation amount over the predetermined time such that a sum of the operation amount of the one driving control and the operation amount of the other driving control is the target operation amount of the other driving force control during the predetermined time, and stops calculation of the first operation amount after the predetermined time elapses.

3. The vehicle control device according to claim 1,
   wherein the controller sets the operation amount of the one driving force control to be an initial value of the operation amount of the other driving force control when the one driving force control is switched to the other driving force control and when the sign of the operation amount of the one driving force control is the same as the sign of the operation amount of the other driving force control.

4. The vehicle control device according to claim 1,
   wherein one of the first driving force control and the second driving force control is slip suppression control for controlling the driving force when a vehicle speed is equal to or lower than a first vehicle speed or exceeds the first vehicle speed, and a turning amount is equal to or less than a first turning amount, and
   the other control different from the one control is posture stabilization control for controlling the driving force when the vehicle speed is equal to or higher than a second vehicle speed or the turning amount is equal to or greater than a second tuning amount.

5. The vehicle control device according to claim 4,
   wherein the slip suppression control is executed when a degree of acceleration increase is equal to or greater than a threshold value, when the vehicle speed is equal to or lower than a third vehicle speed higher than the first vehicle speed, or exceeds the third vehicle speed, and when the turning amount is equal to or less than a third turning amount greater than the first turning amount.

6. The vehicle control device according to claim 1,
   wherein the first driving force control is slip suppression control for controlling the driving force when a vehicle speed is equal to or lower than a first vehicle speed, or exceeds the first vehicle speed, and a turning amount is equal to or less than the first turning amount,
   the second driving force control is posture stabilization control for controlling the driving force when the vehicle speed is equal to or higher than a second vehicle speed or the turning amount is equal to or greater than a second turning amount, and
   the predetermined time is set to be shorter when the vehicle speed is high than when the vehicle speed is low when the first driving force control is switched to the second driving force control.

7. The vehicle control device according to claim 1,
   wherein, when the second driving force control is switched to the first driving force control,
   the predetermined time is set to be longer when the vehicle speed is high than when the vehicle speed is low.

8. The vehicle control device according to claim 1, further comprising:
   a first detector configured to detect information for acquiring a difference between a wheel speed of front wheels and a wheel speed of rear wheels of the vehicle;
   a second detector configured to detect a steering angle of the vehicle; and
   a third detector configured to detect a yaw rate of the vehicle,
   wherein the first calculator calculates a first operation amount for suppressing the difference between the wheel speed of the front wheels and the wheel speed of the rear wheels on the basis of a result of detection of the first detector, and the second calculator calculates a second operation amount for controlling a state of the vehicle such that the vehicle does not have an oversteer tendency or understeer tendency, on the basis of a result of detection of the second detector and a result of detection of the third detector.

9. A vehicle control method comprising:
calculating, by way of a control device, a first operation amount that is a command value of a distribution ratio of a front and rear driving force of first driving force control for controlling a driving force of front and rear driving wheels of a vehicle;
calculating, by way of the control device, a second operation amount that is a command value of a distribution ratio of a front and rear driving force of second driving force control for controlling the driving force of the front and rear driving wheels of the vehicle; and
controlling, by way of the control device, the vehicle by switching between the first operation amount and the second operation amount on the basis of a sign indicating a bias of the distribution ratio of the first operation amount calculated and a sign indicating a bias of the distribution ratio of the second operation amount calculated,
wherein, when one of the first driving force control and the second driving force control is switched to the other driving force control and when the sign of the operation amount of the one driving force control is different from the sign of the operation amount of the other driving force control, the operation amount of the one driving force control is caused to be changed to zero in a predetermined time, the operation amount of the other driving force control is caused to be increased to a target operation amount in the predetermined time, and a driving force of the vehicle is controlled on the basis of the operation amount of the one driving force control and the operation amount of the other driving force control during the predetermined time.

10. A non-transitory computer-readable storage medium that stores a computer program to be executed by a control device to perform at least:
calculate a first operation amount that is a command value of a distribution ratio of a front and rear driving force of first driving force control for controlling a driving force of front and rear driving wheels of a vehicle,
calculate a second operation amount that is a command value of a distribution ratio of a front and rear driving force of second driving force control for controlling the driving force of the front and rear driving wheels of the vehicle, and
control the vehicle by switching between the first operation amount and the second operation amount on the basis of a sign indicating a bias of the distribution ratio of the first calculated operation amount and a sign indicating a bias of the distribution ratio of the second calculated operation amount,
wherein, when one of the first driving force control and the second driving force control is switched to the other driving force control and when the sign of the operation amount of the one driving force control is different from the sign of the operation amount of the other driving force control, the operation amount of the one driving force control is caused to be changed to zero in a predetermined time, the operation amount of the other driving force control is caused to be increased to a target operation amount in the predetermined time, and a driving force of the vehicle is controlled on the basis of the operation amount of the one driving force control and the operation amount of the other driving force control during the predetermined time.

* * * * *